(No Model.)

E. S. MAY.
LETTER SCALE.

No. 493,636. Patented Mar. 21, 1893.

Witnesses:
J. S. Post
T. Belcher

Inventor:
E. S. May

UNITED STATES PATENT OFFICE.

EDWARD S. MAY, OF WASHINGTON, DISTRICT OF COLUMBIA.

LETTER-SCALE.

SPECIFICATION forming part of Letters Patent No. 493,636, dated March 21, 1893.

Application filed December 16, 1892. Serial No. 455,414. (No model.)

*To all whom it may concern:*

Be it known that I, EDWARD S. MAY, a citizen of the United States of America, residing at Washington, in the District of Columbia, have invented certain new and useful Improvements in Letter-Scales, &c.; and I do declare the following to be a full, clear, and exact description of the invention, such as will enable others skilled in the art to which it appertains to make and use the same, reference being had to the accompanying drawings, and to the letters of reference marked thereon, which form a part of this specification.

The object of my invention is primarily to test the weight, approximately, of letters, newspapers, merchandise and other matter of comparatively small size, and secondarily to so form a device that it will also be useful as a paperweight, pen tray and ruler. It is especially adapted to the limits of weight of ordinary mail matter under existing or probable rates of postage. There can be no doubt that a ready test such as this balance affords would in a measure not only avoid the collection of extra postage at the destination of mail matter, but because of the more accurate knowledge of probable postage required the total amount of matter mailed would be increased, lessening labor and cost and increasing government revenue. Its varied usefulness in the office and household is apparent.

In the description similar letters indicate corresponding parts in the different figures.

Figure 1:
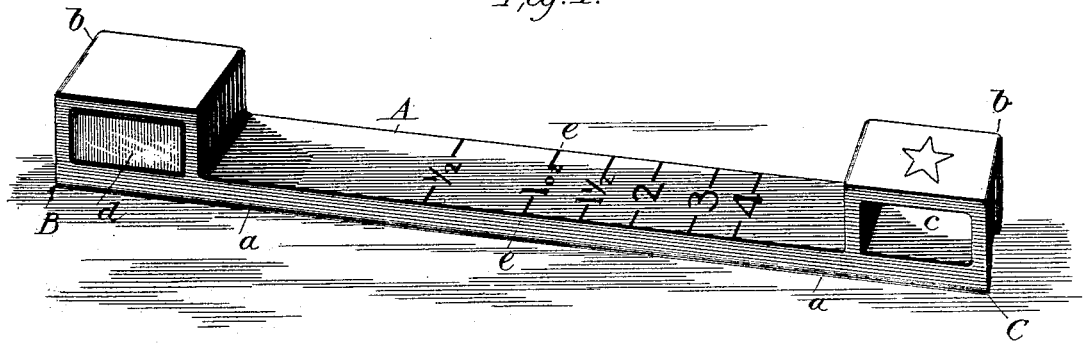
Figure 2:
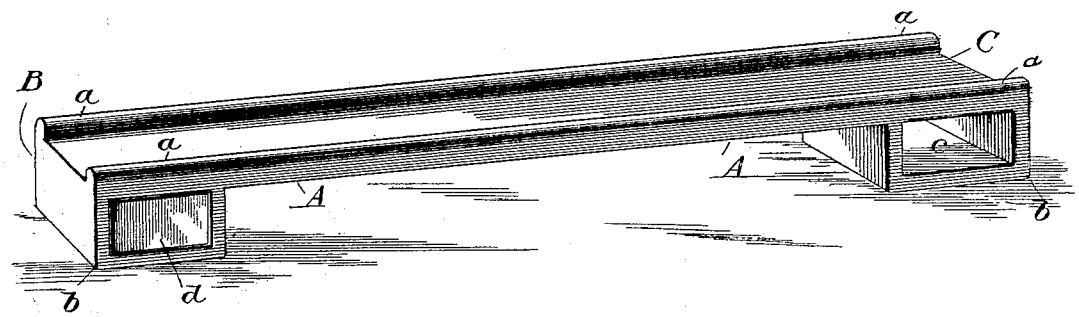
Figure 3:
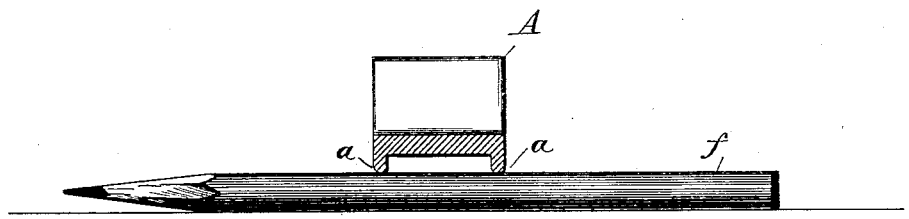

Figure 1 is a top view and Fig. 2 a bottom view of the combination as a whole, in which The body A, A, is represented as consisting of one continuous casting of iron without additional parts, including the projections $b$, $b$, at the ends B, C, and the parallel ridges $a$ $a$, $a$ $a$. It may be formed of any other suitable material, cast or otherwise made, and may be formed of two or more different materials if desired. The theory is, first, that from the center line $e$ $e$, of the body A, A, Fig. 1, the two halves of the balance are of exactly the same weight so that they would just balance if resting on a lead pencil, say, at $e$ $e$, the same weight of metal falling in the same relative situation equidistant from the center. An ounce weight, $d$, is now added to the end B, and it follows that a letter or other matter placed on top of the corresponding upright $b$ at the end C, with its center of gravity over the point indicated by the star, would be tested for the ounce weight. The weight, $d$, may form a part of the projection $b$ at the end B in the original casting. This ounce is now the unit of weight and the balance becomes permanently such with that unit. Shifting the balance so that the pencil rests underneath either line indicated on the upper surface of the body A A, at definite points, enables one to test the weight of matter from one-half up to four ounces. It will be observed that there are two parallel ridges, $a$ $a$, $a$ $a$, Fig. 2, formed lengthwise on the under surface of the body A, A, that these form a continuous track for small pivotal contact at any point when resting on the pencil, as shown in section Fig. 3, and that when the device is used as a pen tray these ridges form the restraining sides thereof, as in Fig. 2.

The use of the device as a ruler and as a paper weight is obvious, the projecting ends at B and C, Fig. 1, facilitating handling.

Having thus described my invention, what I claim, and desire to secure by Letters Patent of the United States, is—

As an article of manufacture the scale consisting of the flat body A A, having uprights $b$, $b$, at ends B, C, parallel ridges $a$ $a$, $a$ $a$, on under surface, the figures and lines on upper surface at determined points from a center line, $e$, $e$, the upright $b$ at the end B including a definite unit of weight, $d$, arranged to operate with a shifting fulcrum, $f$, substantially as described and for the purpose set forth.

In testimony whereof I affix my signature in presence of two witnesses.

EDWARD S. MAY.

Witnesses:
 ABEL HART,
 T. D. KELEHER.